April 5, 1949.  W. C. ANDERSON ET AL  2,466,194

TRAILER VEHICLE CONSTRUCTION

Filed Aug. 18, 1945  9 Sheets-Sheet 1

Inventors
Wilbur C. Anderson and
Edmund W. Riemenschneider
By Frease and Bishop  Attorneys

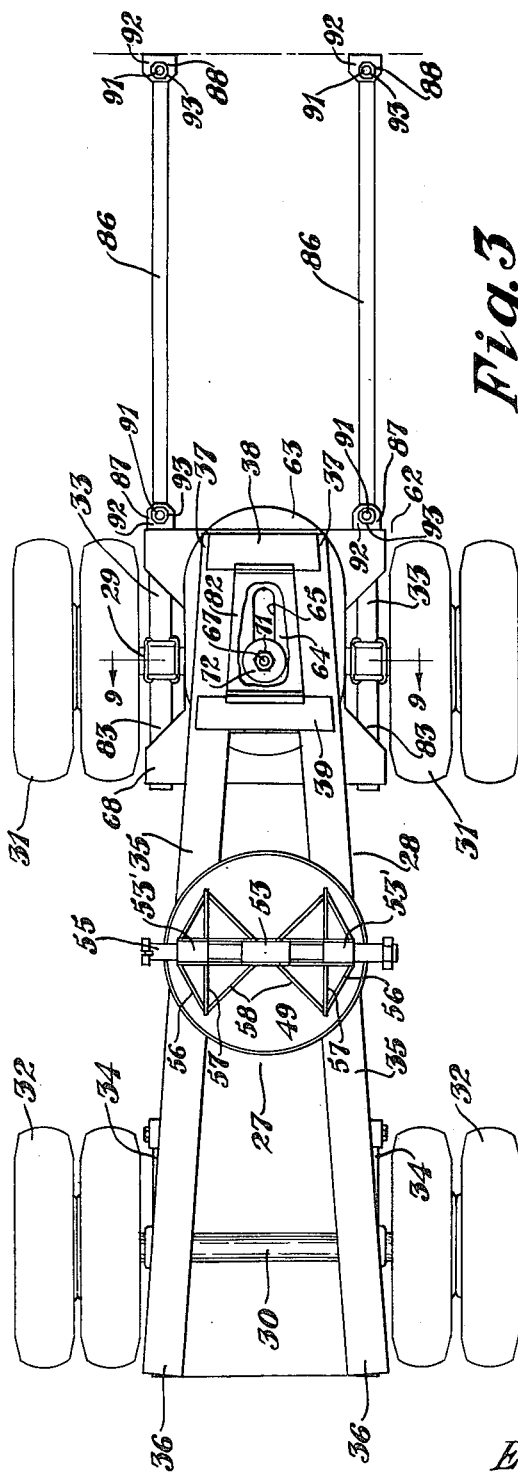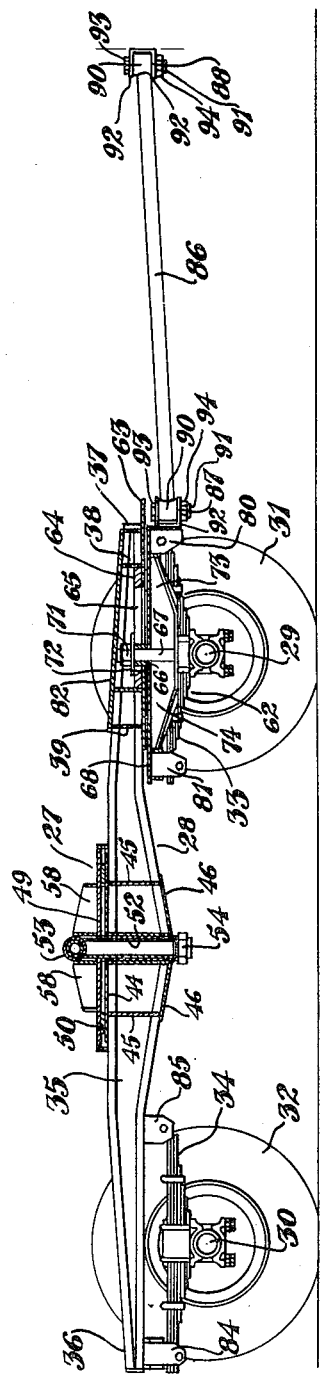

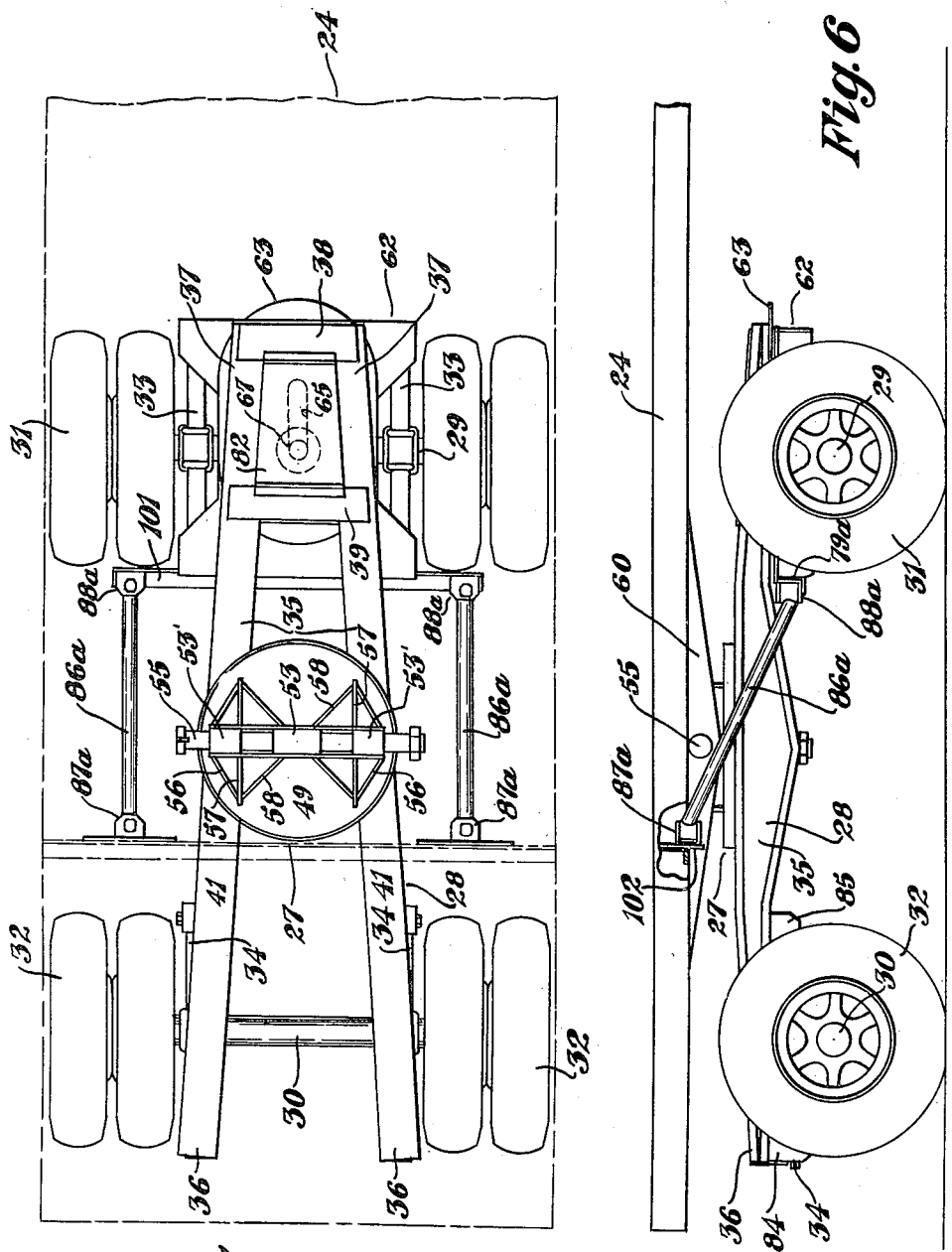

April 5, 1949.   W. C. ANDERSON ET AL   2,466,194
TRAILER VEHICLE CONSTRUCTION
Filed Aug. 18, 1945   9 Sheets-Sheet 4

Inventors
Wilbur C. Anderson and
Edmund W. Riemenschneider
By Frease and Bishop   Attorneys April 5, 1949. W. C. ANDERSON ET AL 2,466,194
TRAILER VEHICLE CONSTRUCTION
Filed Aug. 18, 1945 9 Sheets-Sheet 5
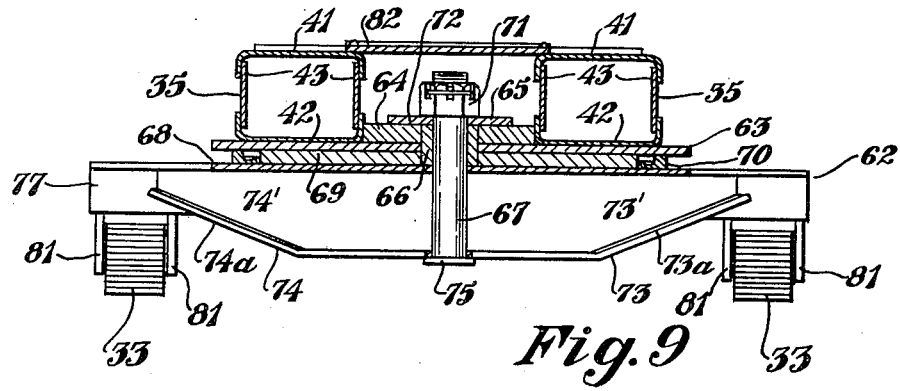
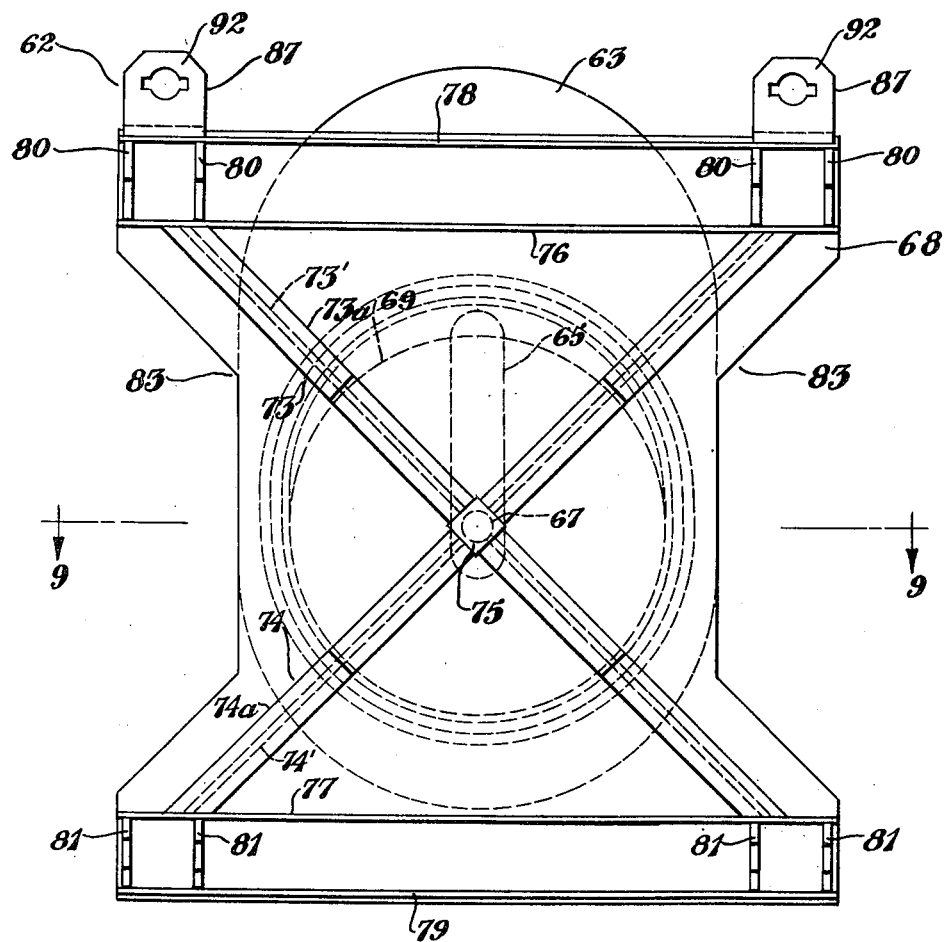
Inventors
Wilbur C. Anderson and
Edmund W. Riemenschneider
By Frease and Bishop Attorneys

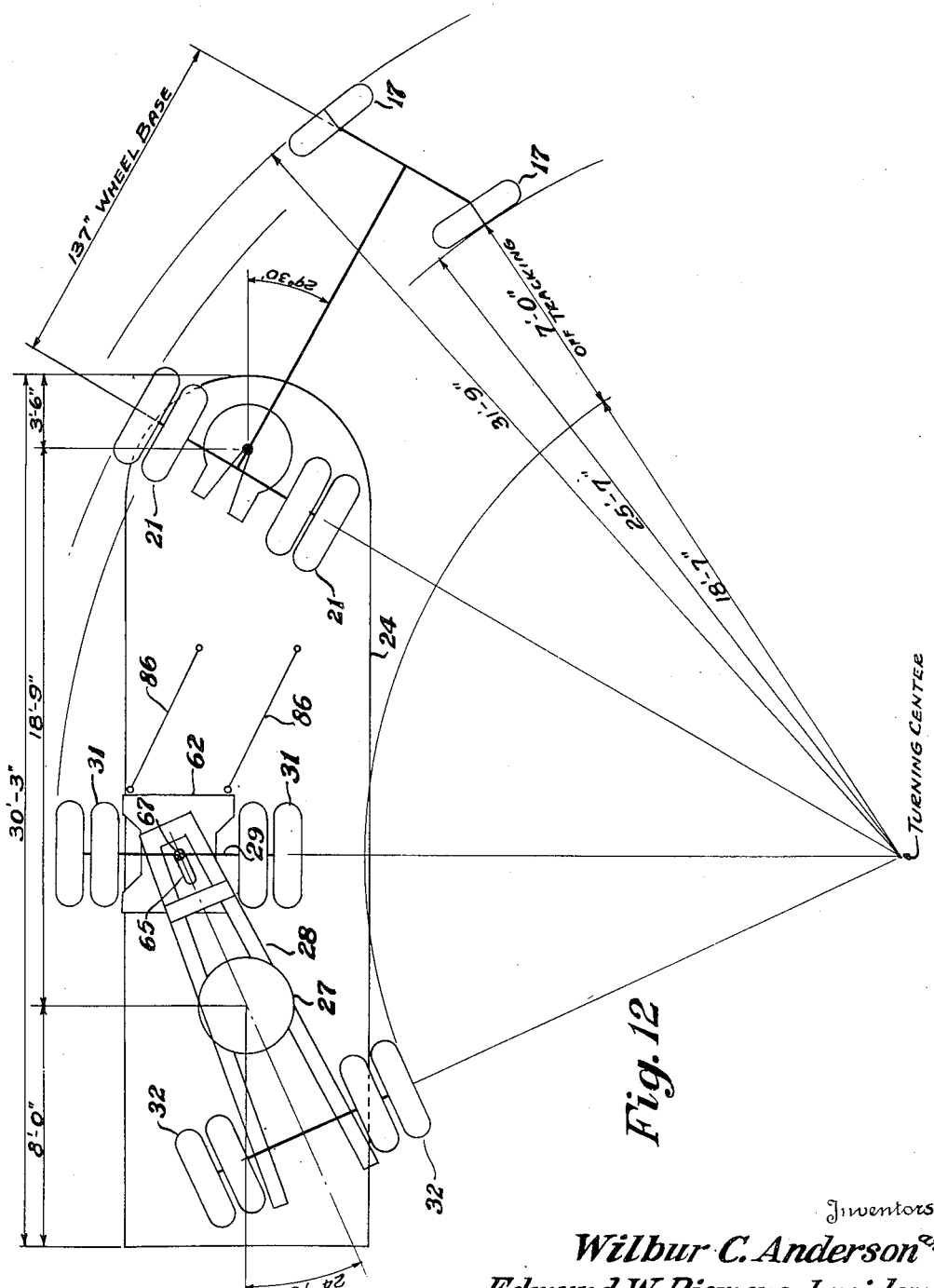

Inventors
Wilbur C. Anderson and
Edmund W. Riemenschneider
By Frease and Bishop
Attorneys April 5, 1949.    W. C. ANDERSON ET AL    2,466,194
TRAILER VEHICLE CONSTRUCTION
Filed Aug. 18, 1945    9 Sheets-Sheet 8

Inventors
Wilbur C. Anderson and
Edmund W. Riemenschneider
By Frease and Bishop
Attorneys Patented Apr. 5, 1949

2,466,194

UNITED STATES PATENT OFFICE 2,466,194

TRAILER VEHICLE CONSTRUCTION

Wilbur C. Anderson and Edmund W. Riemenschneider, Canton, Ohio, assignors to The Union Metal Manufacturing Company, Canton, Ohio, a corporation of Ohio Application August 18, 1945, Serial No. 611,364

18 Claims. (Cl. 280—81)

1

The invention relates generally to highway vehicles for transporting heavy loads, including tractor and trailer combinations, and more particularly to improvements in trailers of the type shown in U. S. Letters Patent No. 2,373,398, issued April 10, 1945, to Ernest S. Hoobler.

The trailer construction shown in said Hoobler patent includes a load carrying platform having its front end supported on the fifth wheel of a standard tractor and its rear end provided with a fifth wheel supported on a two-axle undercarriage, at a point between the axles. The front axle of the undercarriage has a hinged connection with a forwardly extending tongue which is attached to the platform, so that said front axle is towed by the platform.

Such trailer construction accomplishes the purposes of carrying increased pay-loads, providing a longer area for carrying load, and tracks better than many prior constructions; but we have discovered certain improvements which provide still better results in respect to tracking and stability on curves, backing and maneuverability, not only as applied to trailers but also as applied to all vehicles having long bodies or transporting heavy loads, or both.

We have also provided an improved undercarriage frame construction for the vehicle, which allows ample room for turning of the vehicle wheels while providing maximum strength with a minimum weight of frame.

In a trailer of the type shown in said Hoobler patent, wherein the front axle of the undercarriage is connected forwardly with the platform by means of a tongue, we have discovered that in making turns or in following a winding road, the longer the tongue for a given length of platform, the more nearly will the succeeding trailer wheels track or follow each other, the shorter is the turn that can be made, and the less side sway will occur. It follows that a tongue of infinite length would give the best results with respect to tracking and side sway, but since the maximum length of the tongue is limited by the length of the platform, it is apparent that with a tongue of any practicable length the tracking, short turning and side sway performance of the trailer wheels will be materially less than is desired.

Moreover, with a trailer having a relatively short tongue, as the tractor goes into a turn the

2 loaded trailer exerts a quick transverse thrust on the undercarriage connections and tends to oscillate past its desired course. Such oscillation is extremely hazardous to other traffic.

Conventional "tandem" vehicles take a turn by sliding all four wheels of the tandem, which also puts a tremendous lateral strain on the tandem members every time any turn is made. Consequently, the life of the tires, frames, springs and various connections of a tandem is relatively short, resulting in a high maintenance cost.

We have also discovered that in backing a trailer of the type shown in the Hoobler patent, the relative shortness of the tongue tends to cause the undercarriage to leave a straight course faster than the tractor can be maneuvered to follow, with the result that the driver not only loses control of the direction of the undercarriage, but may break the tongue connections.

It is an object of the present invention to provide a trailer construction which attains improved tracking and shorter turning of longitudinally spaced trailer wheels around turns or curves.

Another object is to provide an improved trailer construction which has increased stability on curves, winding roads, and rough surfaces.

A further object is to provide an improved vehicle construction for transporting heavy loads in which the driver can easily maintain control in backing by manipulation of the vehicle front wheels.

Another object is to provide an improved vehicle undercarriage construction in which the undercarriage will change its course on curves or turns gradually and smoothly to eliminate shock loads and oscillation of the vehicle.

A further object is to provide an improved trailer construction in which the towing connection between the platform and the front axle of the undercarriage is equivalent to a tongue of infinite length.

Another object is to provide an improved vehicle undercarriage construction having a towing connection between the vehicle platform and undercarriage which always maintains the front axle of said undercarriage substantially at right angles to the longitudinal axis of said platform.

A still further object is to provide an improved undercarriage frame for supporting the rear end of a vehicle platform, which frame has maximum strength for minimum weight while allowing ample turning room for the front wheels of the undercarriage.

Another object is to provide an improved sliding connection between the undercarriage frame and the front axle of the undercarriage.

A further object is to provide an improved vehicle undercarriage which will track around sharp turns without sliding the wheels of the undercarriage.

Still another object is to provide an improved load-bearing construction on the undercarriage frame for supporting the vehicle platform.

Finally, it is an object of the present invention to provide a strong, compact and light weight vehicle construction which attains all of the foregoing objectives, which is very efficient in all aspects of highway vehicle operation, and which serves to transport increased pay loads within highway over-all length requirements.

These and other objects, which will be apparent to those skilled in the art from the following description, are accomplished by the parts, elements, devices, constructions, arrangements, combinations, and sub-combinations which comprise the present invention, the nature of which is set forth in the following general statement, and preferred embodiments of which are set forth in the following description and illustrated in the accompanying drawings, and which is particularly and distinctly pointed out and set forth in the appended claims forming part hereof.

In general terms, the nature of the invention may be stated as including a vehicle having an elongated load-carrying platform or beam, the forward end of which is supported upon an axle, which may be the rear axle of a towing vehicle, the rear end of the platform being supported on a novel undercarriage by means of a fifth wheel located between two spaced axles embodied in the undercarriage, said undercarriage having an improved A-shaped frame connecting the two spaced axles and being rotatable and slidable with respect to the front axle, and two laterally spaced parallel tongues or connecting rods providing a universal connection between said front axle of the undercarriage and the forward portion of the platform, whereby said front axle is always maintained substantially at right angles to the longitudinal axis of the platform during turning of the vehicle.

In the accompanying drawings, preferred embodiments of the invention are shown by way of example.

Fig. 3 is an enlarged plan elevational view of the improved undercarriage detached from the platform;

Fig. 4 is a longitudinal sectional view thereof;

Fig. 5 is a view similar to Fig. 3, of a modified form of undercarriage having a pair of parallel push bars for making a universal connection between the front axle of the undercarriage and a rear portion of the platform;

Fig. 6 is a side elevational view thereof;

Fig. 9 is an enlarged fragmentary transverse sectional view taken on line 9—9 of Fig. 3, and substantially on line 9—9 Fig. 10;

Fig. 10 is a bottom plan view of the construction shown in Fig. 9, with the springs and parallel towing bars detached therefrom;

Fig. 12 is a diagrammatic plan lay-out showing the relative positions of the axles of a tractor and trailer combination embodying the present improvements, when the combination is in the position of making a sustained curve around a common turning center;

Figure 17:
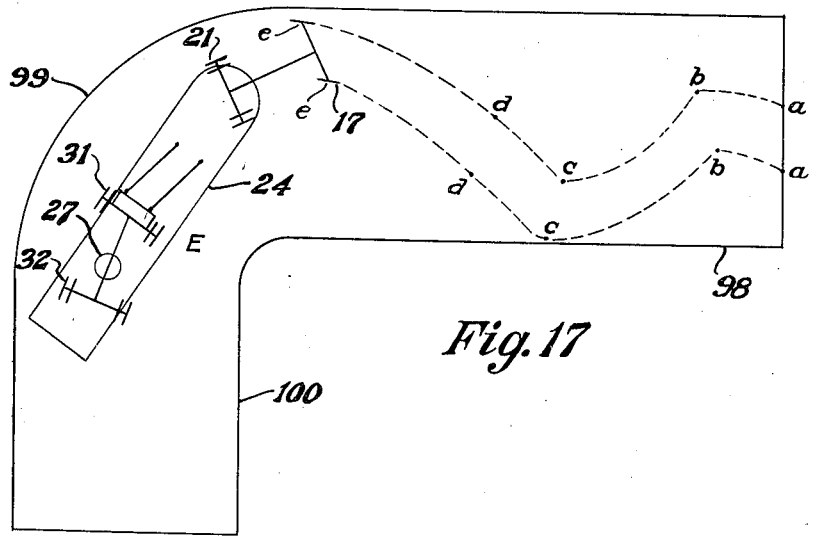
Figure 18:
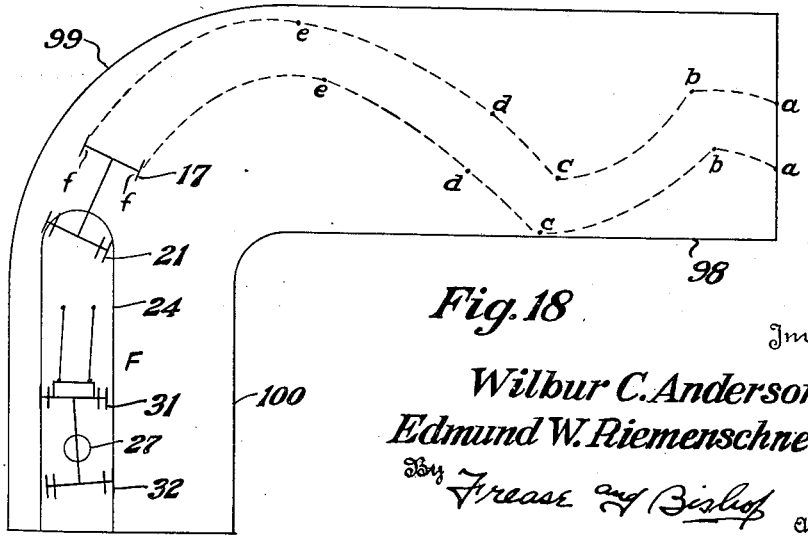
Figure 19:
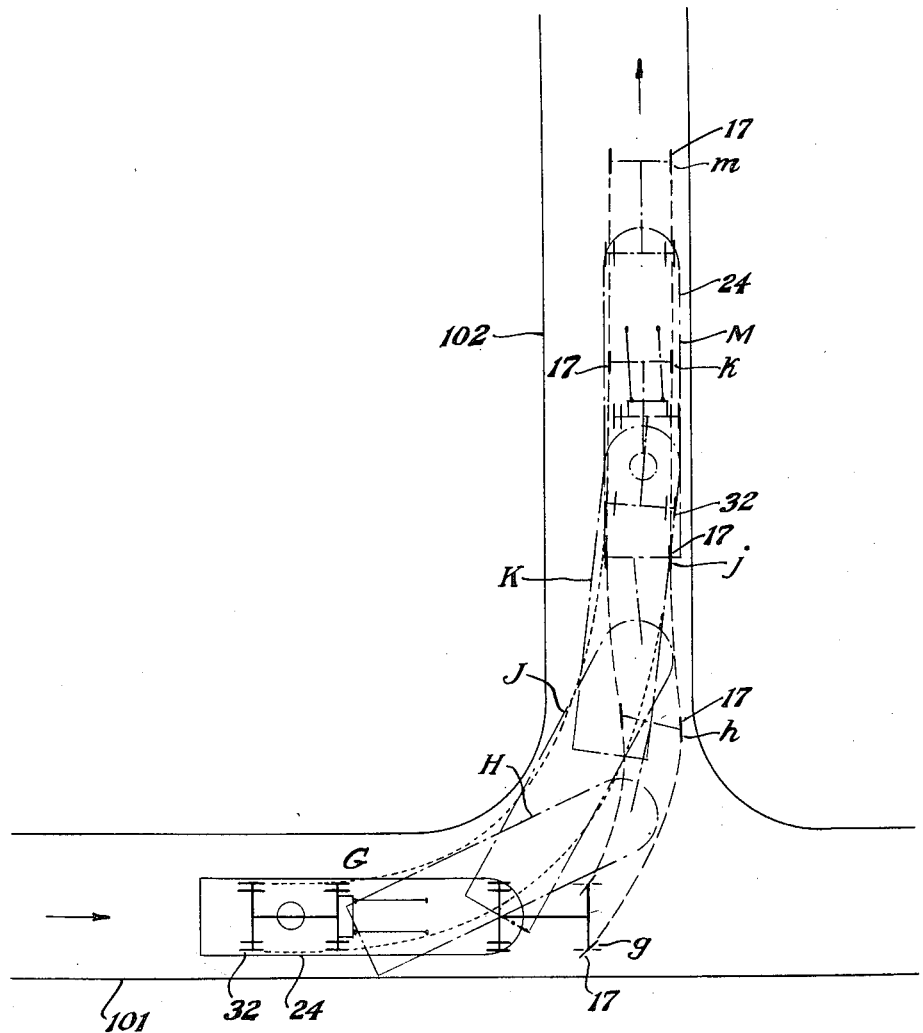

Figs. 13 to 18 inclusive are a series of diagrammatic plan views on a greatly reduced scale, showing the relative positions of a tractor trailer combination embodying the present invention at various stages during the backing of the vehicle around a sharp curve into a position at right angles to its original position; and Fig. 19 is a diagrammatic plan view showing the positions of such a vehicle at various stages while making a sharp right angled turn forwardly as on a narrow roadway.

Similar numerals refer to similar parts throughout the drawings.

While the present invention is shown by way of example as embodied in the undercarriage of a trailer vehicle, it is to be understood that the invention may be applied to the undercarriage of an elongated automotive vehicle having a self-contained power unit, within the scope of the appended claims forming part hereof.

Figure 1:
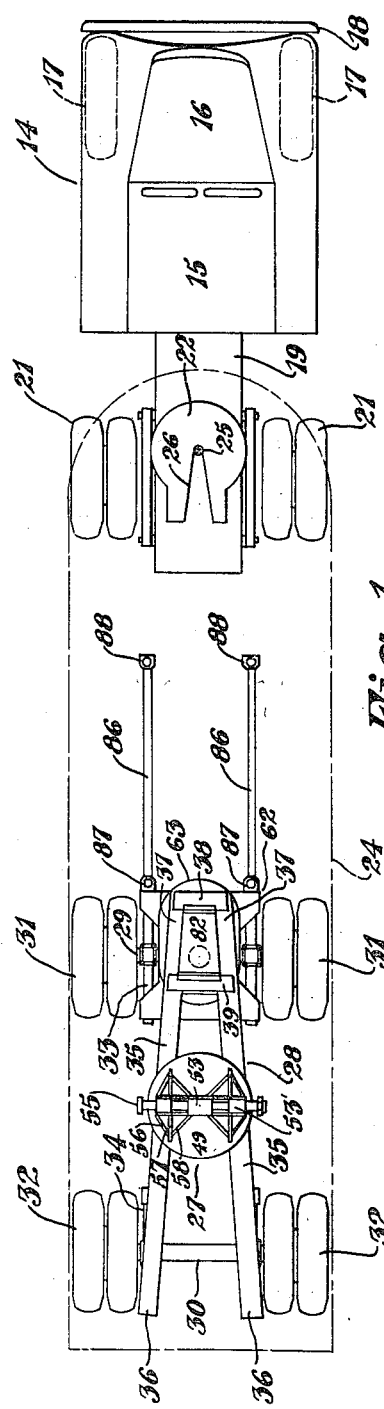
Figure 1 is a plan elevation of the improved undercarriage as applied to a tractor and trailer combination, the trailer platform being indicated in dot-dash lines, and certain details of construction being omitted for the sake of clearness.
Figure 2:
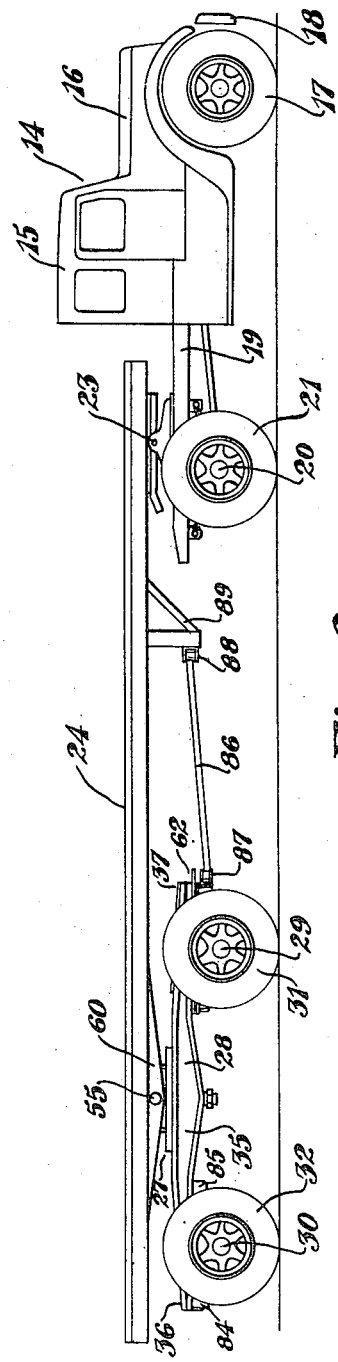
Fig. 2 is a side elevational view thereof.
Figure 8:
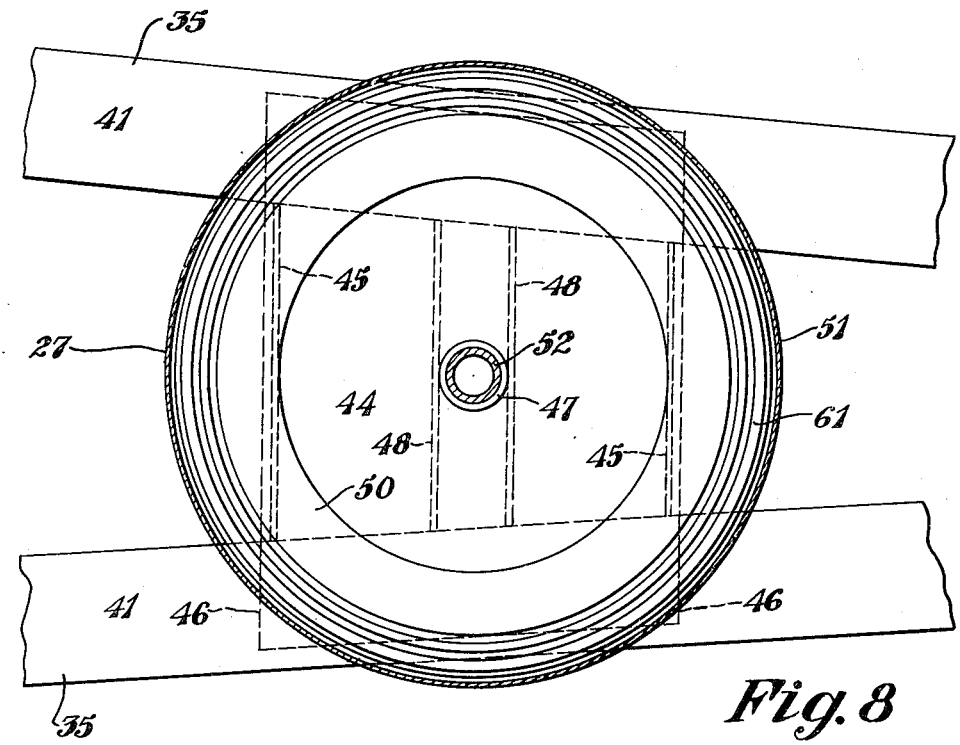
Fig. 8 is a plan sectional view thereof as on line 8—8, Fig. 7.

Referring first to Figs. 1 and 2, a usual automotive tractor is indicated generally at 14 and includes the cab 15, engine hood 16, front wheels 17, and front bumper 18. The frame or platform 19 of the tractor is supported at its rear end on the rear axle 20 and rear wheels 21 of the tractor, and the frame 19 carries a usual fifth wheel indicated generally at 22, which is arranged to rock about its horizontal axis 23 in a well known manner.

The trailer platform 24 has the usual king pin 25 mounted on the underside of its front end, and the king pin 25 is adapted to enter the guideway 26 of the fifth wheel 22 and engage in the socket thereof so as to form a vertical pivot about which the trailer platform 24 can swing horizontally relative to the tractor.

The construction of the tractor 14 and the fifth wheel connection with the trailer platform 24 are conventional and well known and form no part of the present invention.

The rear end of the trailer platform 24 is supported by means of a fifth wheel connection indicated generally at 27, on the A frame 28 of an undercarriage carried on a front axle 29 and a rear axle 30. These axles are preferably carried by dual wheels 31 and 32 respectively, and the frame 28 is resiliently supported on the axles by means of leaf springs 33 and 34 respectively, as best shown in Fig. 4. The fifth wheel 27 is supported on the A frame 28 of the undercarriage and is located between the axles 29 and 30.

Referring to Figs. 3, 4 and 9, the A frame 28 preferably includes two side members or beams 35 which are divergent at their rear ends 36 so as to be positioned directly over the rear ends of springs 34, and side members 35 converge at their forward ends 37 so as to be closely spaced from each other, the forward ends being connected by a short cross member 38 and by an intermediate cross member 39 located between the axle 29 and the fifth wheel 27.

As best shown in Fig. 4, the cross members 39 and 38 are preferably hollow and made up of plates welded to the side frame members 35, and as shown in Fig. 9 the side frame members 35 are preferably made up of bent top plates 41 and bent bottom plates 42, welded to the outside of side plates 43 to form hollow box beams of rectangular cross section. By positioning the plates 43 inside of the vertical flanges of the bent plates 41 and 42, the welds are made at the edges of said flanges which are located away from the high stress areas at the top and bottom of said plates. Thus, the beams 35 have maximum strength with a minimum utmost fiber stress.

As best shown in Fig. 4, the side frame members 35 have their greatest depth at the central portion for supporting the fifth wheel 27, and taper from the central portion to become relatively shallow at their ends 36 and 37.

As best shown in Figs. 3, 4, 7 and 8, the fifth wheel 27 preferably consists of a flat circular plate 44 which spans the side members 35 and is welded to the top thereof, said plate being supported by webs 45 extending transversely between the side members 35 and welded thereto, and also being welded at their bottom edges to bottom plates 46 which are in turn welded to the undersides of the side members 35. At the center of the plate 44, a vertical tube or pipe 47 extends through the plate and projects through the bottom plates 46, said tube 47 being reenforced by transverse webs 48 welded to the tube 47 and at their ends to the frame members 35.

Thus, the A frame 28 has great resistance to torsion because all of its members, namely side members 35, cross members 38 and 39, and the transverse members supporting fifth wheel 27, are of hollow box beam construction.

The upper plate 49 of the fifth wheel 27 has a bronze ring 50 brazed to its undersurface for bearing on the plate 44, and has a depending flange 51 at its outer edge for encircling the outer rim of the circular plate 44. A hollow bolt 52 extends vertically through the center of the upper plate 49 and is adapted to fit rotatably in the sleeve 47, being welded to the plate 49 and supporting at its upper end a central trunnion bearing 53. The lower end of the hollow bolt 52 projects below the bottom plates 46 and is externally threaded to receive the lock nut 54 for holding the parts of the fifth wheel 27 in assembled relation.

Figure 7:
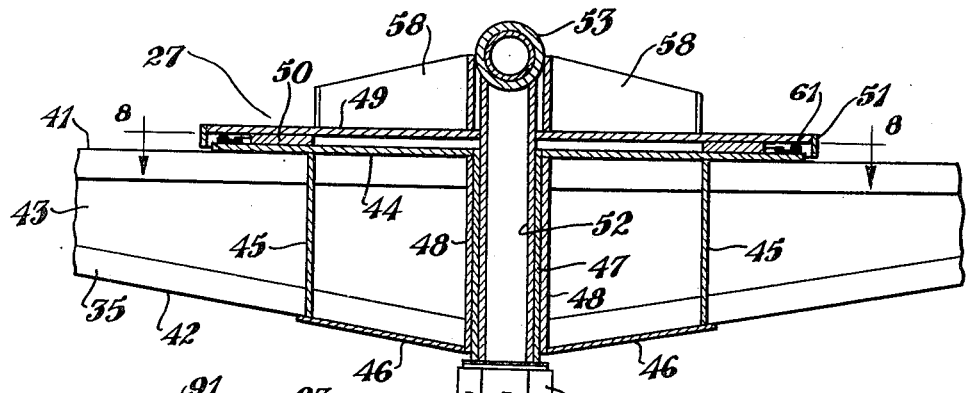
Fig. 7 is an enlarged fragmentary sectional view similar to Fig. 4, showing the method of supporting the platform on the A frame of the undercarriage.

As best shown in Fig. 3, the central trunnion bearing 53 has end bearings 53' spaced laterally thereof, and the bearings 53 and 53' are transversely aligned to receive the trunnion bolt 55 which acts as the horizontal pivot for the fifth wheel 27. As shown in Figs. 3, 4 and 7, the bearings 53 and 53' are rigidly supported by a series of angular ribs 56, 57 and 58 which are welded at their inner edges to the bearings and at their bottom edges to the fifth wheel plate 49, and are designed to distribute the stresses from the trunnion outwardly to the outer circumferential portion of the fifth wheel plate 49 which is supported by the sides of the A frame members 35 and the transverse webs 45. Likewise, the bronze ring 50 which transmits the load from the top fifth wheel plate 49 to the bottom plate 44 is located at the outer circumferential portion of the plates. Thus, the load of the trailer platform is evenly distributed over a relatively large area on the A frame 28.

As shown in Fig. 3, the trunnion 55 projects laterally outwardly from the bearings 53' to provide spaces for attaching bearing sleeves mounted on the underside of the trailer platform, and the spaces between the bearings 53 and 53' are for the same purpose. These bearing sleeves on the trailer platform may be mounted in tapered ribs 60 extending longitudinally of the trailer platform 24, as shown in Figs. 2 and 6, and secured to the underside of the platform as by welding.

As shown in Fig. 7, an annular gasket 61 may be mounted on the upper side of the fifth wheel plate 44 outwardly of the ring 50, for providing a seal between the plates 44 and 49 so that a suitable lubricating fluid may be retained between the plates for aiding the relative rotation between the upper fifth wheel plate 49 and ring 50 and the lower fifth wheel plate 44.

Referring to Figs. 3, 4 and 9, the front end of the A frame 28 is slidably and rotatably supported on a novel dolly frame indicated generally at 62, which is resiliently carried on the axle 29 by springs 33. As best shown in Fig. 9, an upper load-bearing plate 63 is secured, as by welding, to the bent plates 42 forming the undersurface of the side frame members 35 at the front ends thereof. The plate 63 preferably has arcuate ends and is elongated longitudinally of the A frame so as to have a substantially elliptical shape.

A back-up plate 64 of trapeziform shape is located on top of the plate 63 and is welded at all four edges to the side frame members 35 and the cross members 38 and 39. The plates 63 and 64 are provided with an elongated slot 65 extending longitudinally for slidably receiving a bushing 66 on the pivot pin 67 of the dolly.

Preferably, the dolly 62 has a top plate 68 on which is mounted, as by brazing, a circular brass thrust plate 69 for rotatably supporting the load-bearing plate 63, and an elliptical gasket 70 may be secured to the top plate 68 surrounding the thrust plate 69 for retaining lubricant between the plates 63 and 69.

The bushing 66 surrounding the pivot pin 67 of the dolly is secured in a central hole in the thrust plate 69, and its bottom end rests on the top plate 68 of the dolly frame. The bushing 66 is slidably received in the slot 65 of the plates 63 and 64, and the upper end of the bushing is flush with the top of plate 64. Preferably, the pin 67 projects above the plate 64 and is externally threaded to receive a lock nut 71, there being a washer 72 interposed between the nut 71 and the back-up plate 64.

The lower end of pin 67 extends below the top plate 68 as shown in Figs. 4 and 9 and is secured by welding to the centers of diagonally extending cross beams 73 and 74, as shown. The beams 73 and 74 have vertical webs 73' and 74' and bottom angular flanges 73a and 74a, and the webs are shallow at their outer ends and have their greatest depths at their central portions which are welded to the pivot pin 67. Preferably, a cap plate 75, which may be substantially square is welded to the bottom of pivot pin 67 overlapping the adjoining edges of the flanges 73a and 74a of the cross beams.

The outer ends of the cross beams 73 and 74 are welded to transverse vertical flanges 76 and 77 which depend from the front and rear ends of the top plate 68 of the dolly frame. Another transverse flange 78 depends vertically from the top plate 68 a short distance in front of the plate 76, and a transverse vertical flange 79 depends from the top plate 68 a short distance behind the transverse vertical plate 77. The transverse plates 76 and 78 are spaced apart a distance sufficient to receive longitudinally disposed depending spring shackle plates 80 for mounting the front ends of springs 33, and the plates 77 and 79 are spaced apart a distance sufficient to receive longitudinally disposed shackle plates 81 for mounting the rear ends of said springs.

Preferably, a trapeziform cover plate 82 is attached to the inside edges of the transverse frame members 38 and 39 and the portions of the side frame members 35 therebetween, to form a closure for the trapeziform opening above the back-up plate 64, in order to keep out dust and dirt and insure smooth sliding action of the bushing 66 in the slot 65. As shown at 83, the top plate 68 of the dolly may be recessed on each side between the transverse plates 76 and 77 to have a width equal to that of the substantially elliptical plate 63.

Thus, the cross beam members 73 and 74 provide an X frame connected to the transverse flanges 76 and 77 of the dolly, to uniformly distribute the loads transmitted from the A frame through the fifth wheel plate 63 outwardly to the spring shackle plates 80 and 81, without requiring any longitudinal outer side frame members. Accordingly, the front end of the A frame may be made quite narrow to permit a substantial amount of turning on the pivot 52 with respect to the wheels 31, as indicated in Fig. 12.

As indicated in Fig. 4, the divergent rear ends 36 of the side frame members 35 of the A frame are provided with depending shackle plates 84 for supporting the rear shackles of springs 34, and the side members 35 are provided at intermediate points with depending shackle plates 85 for mounting the front shackles of the springs 34.

Thus, the novel A frame 28 is subjected to very little torsion because the rear end is directly over the springs 34, and the ring 50 which transmits the load is supported on the side members 35 at points substantially in line with the rear spring shackles and the front pivot 25. The front end is narrow to permit maximum turning of the frame with respect to the wheels 31, while the dolly frame construction provides for distributing the load equally to the ends of the springs 33. Throughout the novel A frame, the welds are substantially all located away from the high stress areas, so that the frame has high uniform fiber stress throughout its length, resulting in a maximum strength with a minimum of weight.

As best shown in Figs. 4 and 10 the novel connecting rods may be parallel towing bars 86 substantially universally connected at their rear ends to the dolly frame 62, preferably by means of U-shaped mounting brackets or clevises 87 which are attached, as by welding, to the front transverse plate 78. The front ends of the parallel bars 86 are substantially universally connected to a forward portion of the platform 24 by means of similar clevises 88 which are secured to suitable brackets depending from the platform, as indicated at 89 in Fig. 2.

Figure 11:
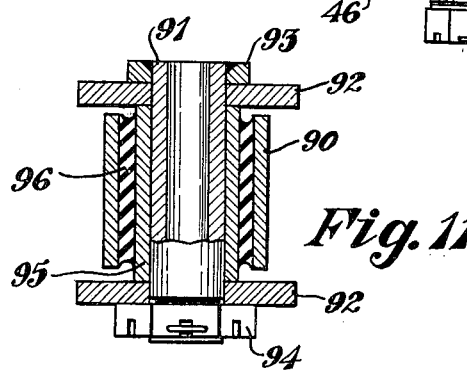
Fig. 11 is an enlarged vertical sectional view of one of the universal connections at the ends of the parallel towing bars.

The parallel bars 86 may be constructed of pipes or tubing which are welded at their ends to vertical sleeves 90 and the sleeves 90 are preferably mounted in the clevises 87 and 88 in the manner shown in Fig. 11. A hollow pivot pin 91 extends through the top and bottom flanges 92 of each clevis 87 or 88, and has a top head flange 93 welded thereon and a lock nut 94 screwed on its bottom end. A sleeve 95 is journalled on the pivot pin 91, and the vertical sleeves 90 at the ends of the bars 86 surround the journal sleeves 95 and are attached thereto by means of a rubber sleeve mounting 96 which is vulcanized to the inside of the vertical sleeve 90 and to the outside of the journal sleeve 95.

Such mounting permits a limited amount of universal motion of the bars 86 about the sleeve 95 as a pivot, so as to provide a floating substantially universal joint connection between the parallel bars 86 and the clevises 87 and 88. Such motion is sufficient to take care of the rocking movement of the undercarriage about the trunnion 55 as a pivot, due to the wheels 31 and wheels 32 passing successively over depressions or elevations in a roadway, and provides for exceptionally smooth riding of the platform 24 over rough or uneven road surfaces, and reduced impact of the vehicle on the road surface.

Figure 13:
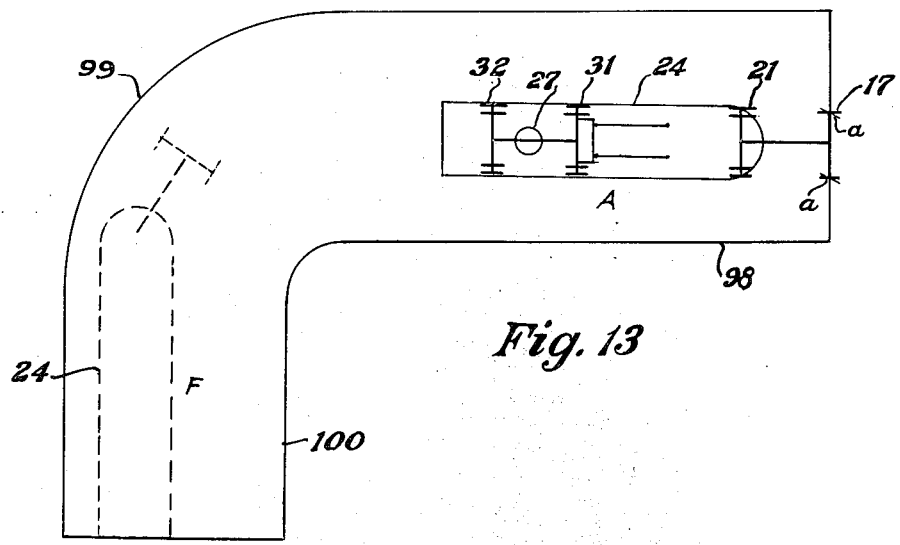
Figure 14:
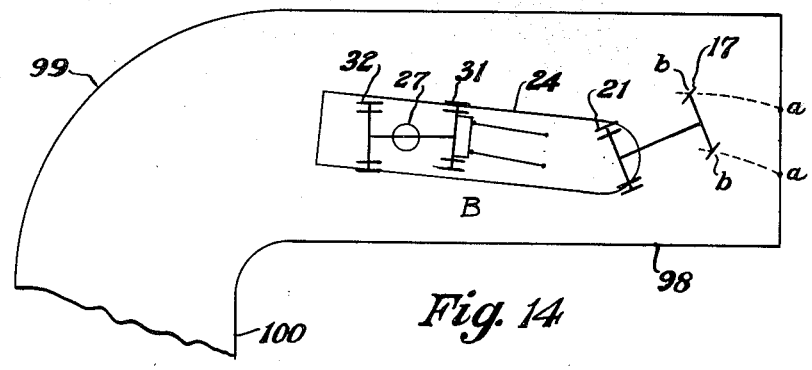

In operation, the novel parallel bars 86 provide a towing arrangement which always maintains a parallelogram, regardless of the amount of turning of the A frame 28 with respect to the wheels 31 of the dolly 62. The parallel towing bars obtain the effect of a single tongue of infinite length, and thus produce the desired results of maximum tracking of successive wheels on curves, and a minimum amount of side sway. The parallel bars always maintain the axle 29 of the wheels 31 at right angles to the length of the platform 24, regardless of the character or degree of the curve around which the vehicle passes, as is indicated in Figs. 12, 13 and 14. Thus, the wheels 31 of the undercarriage provide maximum stability of the vehicle on curves, and prevent oscillation of a trailer vehicle, while at the same time providing improved tracking of the succeeding wheels of the vehicle.

The bars 86 may be made slightly angled relative to each other, that is slightly convergent or divergent, and still obtain the practical effect of a long single tongue; in which case they may be referred to as substantially parallel.

Referring to Fig. 12, for the purpose of showing the amount of off tracking in a tractor trailer combination such as shown in Fig. 1, the positions of the various wheels all turning about a common center are shown when the vehicle is making a sustained curve of minimum turning radius. In such case, the angle of the tractor with respect to the longitudinal axis of the trailer platform 24 is 29° 30' and the angle of the A frame with the axis of the trailer platform is 24° 10'. As shown, the axle of the wheels 31 on the dolly frame 62 is at right angles to the longitudinal axis of the platform 24, and the A frame 28 is turned a maximum amount on the fifth wheel 27 relative to the wheels 31.

In this position of the dolly 62, the pivot pin 67 has moved to the front end of the slot 65 in order to allow the dolly 62 to move laterally and still be maintained with the axle 29 at right angles to the longitudinal axis of platform 24.

As shown in Figure 12, the wheels 17 and 21 of the tractor, and the wheels 31 and 32 of the undercarriage all have the same turning center, and for a tractor having a 137" wheel base and a trailer platform of 30' 3" the radius of the turning circle measured to the outside of outer wheel 17 is 31' 9", and to the inner side of inner wheel 17 is 25' 7". The radius of the turning circle of the wheels 32 measured to the inner side of the innermost wheel, is 18' 7". The difference between these latter two radii is 7' 0", so that the amount of off tracking of the wheels 32 with respect to the wheels 17 at the front end of the tractor is 7' 0".

We have found in actual practice that the novel parallel towing bars 86 provide better tracking of the wheels in advancing around curves on a roadway, and in making sharp turns from one narrow street to another. For example, we have actually demonstrated that the vehicle will make a turn from one 15' alley to another 15' alley (curb to curb) at right angles to the first, without any wheels running over any curb. The novel bars 86 provide much greater control in backing the vehicle, which also has been demonstrated in actual practice. The effect of the parallel towing bars 86 in backing is to cause the rear wheels 32 of the undercarriage to leave a straight course gradually so that the front wheels 17 of the tractor can be maneuvered to follow the desired course of the rear wheels 32 and the driver at all times has control of the rearward direction of the undercarriage.

Referring to Figs. 13 to 18 inclusive, in Fig. 13 a tractor trailer combination such as shown in Fig. 1 is indicated on a roadway at a position A where it is longitudinally aligned with a straight portion 98 of the roadway. Assuming that it is desired to back the vehicle around the relatively sharp turn 99 to the position F where the trailer platform 24 is at right angles to its original position and is longitudinally aligned with a straight portion of the roadway 100 at right angles to the portion 98, the positions of the vehicle at various stages are shown in Figs. 14 to 18 inclusive.

In the backing operation, the front tractor wheels 17 at the position $a$ are first turned and backed to follow a path indicated in dotted lines until the front wheels reach the position indicated at $b$ in Fig. 14, and the trailer platform 24 has then reached the position B, while the wheels 31 of the undercarriage have moved slightly upwardly relative to the platform and the wheels 32 have swung slightly downwardly. Thus, the undercarriage is in a position of starting to follow around the curve 99 of the roadway. As soon as approximately the position B is reached, the driver reverses the wheels 17 to turn them sharply in the opposite direction and continues to back the vehicle.

Figure 15:
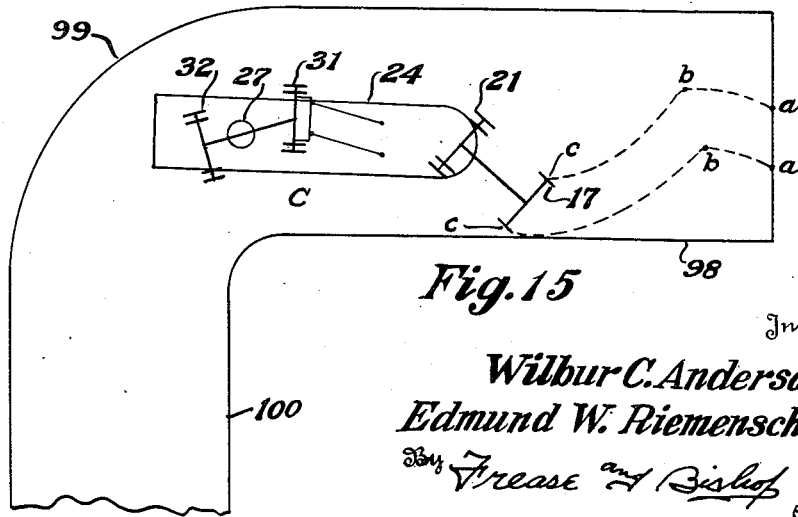

As the vehicle moves rearwardly, and the front wheels 17 move from the position $b$ to the position $c$ of Fig. 15, the trailer platform 24 moves very little laterally of the roadway 98, but the wheels 31 and 32 of the undercarriage move considerably to start a course following the curve 99 of the roadway. In the position C of the trailer platform, the wheels 31 have moved upwardly a substantial amount relative to the platform 24, while the wheels 32 have swung downwardly around the fifth wheel 27. When the front wheels 17 of the tractor have reached a position approximating $c$, the driver again reverses the direction of the wheels 17 in a position to follow substantially the curved course of the wheels 31 and 32, and continues to back the vehicle.

Figure 16:
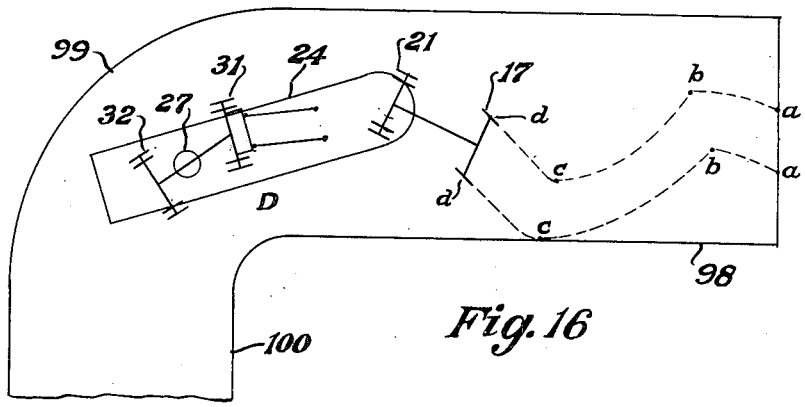

When the front wheels 17 reach a position approximating $d$ as shown in Fig. 16, the platform 24 is in a position D in which the wheels 31 and 32 of the undercarriage are in substantially the same position relative to the platform as in the position C, but the platform 24 has started to follow the course of the curve 99 of the roadway.

As the vehicle is backed from the position D, the front wheels 17 continue to follow the upward curve indicated by the dotted lines in Fig. 17, and when they reach a position approximating $e$, the trailer platform 24 has followed the curve 99 downwardly to the position E. In this position, the undercarriage is still swung to follow the course of the curve 98 somewhat ahead of the trailer platform 24 and is at the point of gradually straightening up to become aligned with the straight portion 100 of the roadway.

As the vehicle continues to move rearwardly, the front wheels 17 are turned to follow a downwardly curving course to approximately the position $f$, as indicated by the dotted lines in Fig. 18, during which time, the trailer platform 24 has moved downwardly to the position F and has gradually straightened out to become aligned with the straight portion 100 of the roadway.

During the entire backing operation, wherein the front wheels 17 of the tractor follow the course indicated in Fig. 18 by the dotted lines $aa$, $bb$, $cc$, $dd$, $ee$, $ff$, the entire vehicle stays within the confines of the relatively narrow roadway 98, 99, 100 and makes the sharp right angled turn to the position $f$ in a minimum distance. It has been found in actual practice that this backing operation can be executed easily by the average driver with a small amount of practice, because the driver can determine how to steer the front wheels 17 of the tractor by watching the relatively gradual change of course of the wheels 31 and 32 of the undercarriage. If at any time, the wheels 31 and 32 are seen to be leaving the desired course, the driver can turn the wheels 17 sharply to change their course rapidly and control the course of the wheels 31 and 32.

Referring to Fig. 19, a tractor trailer combination such as shown in Fig. 1 is shown diagrammatically at various stages while making a right angled turn from one narrow roadway into another. The roadway 101 may be a narrow street or alley approximately 15 feet wide, and the roadway 102 may be another street or alley of about the same width intersecting the street 101.

The vehicle is shown at a position G in which the tractor and trailer are in longitudinal alignment with the street 101. Assuming that it is desired to turn the vehicle into the street 102 to reach a position M where it is in longitudinal alignment with the street 102, the driver first turns the front wheels 17 of the tractor sharply to the left, and as the vehicle moves forwardly the wheels 17 follow the dash line from the position $g$ to a position approximating $h$. In this position the trailer platform 24 has moved to the position H and is starting to follow the course of the tractor around a sharp curve to the left. As the front wheels 17 proceed from the position $h$ to a position approximating $j$, the trailer platform 24 moves to the position J which is close to the inner curb at its left side with its front end following around the turn and starting into the straight portion of the street 102.

As the wheels 17 proceed forwardly, they are gradually straightened out and when the position $k$ is reached, the trailer platform has reached a position K where it is beginning to straighten out to become aligned with the roadway 102. When the wheels 17 have reached the position $m$, the platform 24 is in the position M which is longitudinally aligned with the roadway 102.

As the platform 24 proceeds through the various positions G, H, J, K, M, the rear wheels 32 of the trailer undercarriage follow the course indicated by the dotted lines from the position G to the position M, where they are again in substantially longitudinal alignment with the front wheels 17 of the tractor. Since the inner wheel 32 turns on the shortest radius, and the outer wheel 17 turns on the longest radius, as is shown in Fig. 12, the inner dotted line of Fig. 19 represents the course of the innermost wheels and the outer dash line represents the course of the outermost wheels while the right angled turn is being made. Thus, it is apparent from Fig. 19 that the vehicle can be turned from the narrow roadway 101 around a sharp right angled turn into the roadway 102 without any of the vehicle wheels contacting either curb of either roadway.

It is apparent from Fig. 19, that if the tractor trailer combination is parked in the position G closely along side a curb and it is desired to drive the tractor trailer combination away from the curb and into a left turn, the desired result can be accomplished without any possibility of the rear wheels 32 of the undercarriage running over the curb 100, which is the case in many prior tractor trailer constructions.

We have found that a tractor trailer combination embodying the present invention has increased stability on curves and winding roads, which is apparently because the undercarriage goes into or comes out of a curve gradually, thereby eliminating sudden shocks on the connections between the undercarriage and trailer platform and substantially eliminating oscillation of the trailer. Moreover, as the trailer goes into a curve to follow the tractor, we believe that the momentum of the trailer has the effect of making the rear wheels of the undercarriage track better and follow the front end of the tractor more gradually and smoothly.

The modified form of the novel and improved undercarriage shown in Figs. 5 and 6 is generally similar to the undercarriage shown in Figs. 3 and 4 with the exception of the parallel bars connecting the dolly frame to the platform. In the embodiment of Figs. 5 and 6, the trailer platform 24 is supported by means of the fifth wheel connection indicated generally at 27 on the A frame 28 of the undercarriage, which is carried on front axle 29 and rear axle 30 mounting the dual wheels 31 and 32 respectively.

The trunnion 55 of the fifth wheel 27 is journalled in bearings 53 and 53' which are carried on the upper fifth wheel plate, and is also journalled in bearings mounted in the tapered ribs 60 which extend longitudinally of the trailer platform 24 and are secured to the underside thereof.

The dolly frame indicated generally at 62 is carried on the axle 29 by springs 33 and is rotatably and slidably connected with the front end of A frame 28 by means of the pivot pin 67, slidably engaged in the slot 65 of the elliptical fifth wheel plate 63.

All of the parts of the embodiment, shown in Figs. 5 and 6 thus far referred to, are substantially identical with the corresponding parts of the embodiment shown in Figs. 1 to 4 inclusive. However, in the embodiment of Figs. 5 and 6, the novel connecting rods or parallel bars which provide a substantially universal connection between the dolly frame 62 and the platform 24, are shown as parallel push bars 86a rather than parallel pull or towing bars.

In this embodiment, the front ends of the bars 86a are connected at 88a to an angle bar 101 which is secured to the rear transverse depending flange 79a of the dolly frame 62. The rear ends 87a of the parallel push bars 86a are connected to a transverse flange 102 which is secured in a suitable fashion to the underside of the platform 24. The connections 87a and 88a are spaced apart laterally a somewhat greater distance than the connections 87 and 88 of the towing bars 86, so as to give ample turning room for the A frame 28 with respect to the platform 24.

The connections 87a and 88a are identical with the connections 87 and 88 and provide movement of the bars about vertical pivots at those points and substantial movement about horizontal pivots by means of floating rubber bushings, so as to provide substantially universal connections at the ends of the parallel push bars.

In operation, the parallel push bars 86a provide a pushing arrangement which is always maintained in the shape of a parallelogram regardless of the amount of turning of the A frame 28 with respect to the platform and wheels 31 of the dolly 62. The parallel push bars 86a obtain the effect of a single tongue of infinite length, and thus produce the desired results of maximum tracking on curves with a minimum amount of side sway.

In addition, the parallel push bars require less longitudinal sliding movement between the pin 67 and the slot 65, but as the vehicle is backed into a cramped position, that is, in a position of making the shortest possible turns, greater stresses are set up in the undercarriage than are set up with the parallel towing bars 86.

Moreover, due to the inclination of the push bars 86a in a downward direction forwardly, the construction of Figs. 5 and 6 results in greater shocks due to impacts from bumps or rough roadways, than is the case with the towing bars of Figs. 1 to 4 inclusive.

While the improved undercarriage embodying the invention has been shown and described by way of example as applied to the trailer of a tractor trailer combination, it is to be understood that the improved undercarriage can be applied to the load carrying platform or frame of a variety of vehicles for transporting heavy loads, and that such embodiments are within the scope of the appended claims.

The present invention provides an improved vehicle undercarriage which accomplishes better tracking and gradual change of course of longitudinally spaced wheels in turning curves, thereby eliminating shock loads, side sway and oscillation of the vehicle; and which is capable of making shorter turns without sliding the wheels than a vehicle having a single tongue. Moreover, the invention provides an improved vehicle undercarriage which provides easy control in backing of the vehicle rear wheels by maneuvering the front wheels, because the front wheels can be maneuvered rapidly enough to keep ahead of the off course tendency of the rear wheels.

All of the foregoing advantages are attained in a vehicle construction which combines maximum strength with minimum weight.

In the foregoing description, certain terms have been used for brevity, clearness and understanding, but no unnecessary limitations are to be implied therefrom beyond the requirements of the prior art, because such words are utilized for descriptive purposes and are intended to be broadly construed. Thus, the term "substantially parallel" as applied to the bars 86 and 86a in the description and claims, is intended to include bars which are slightly convergent or slightly divergent; and the term "connecting rod" is intended to include either the towing bars 86 or the push bars 86a.

Moreover, the embodiments of the improved construction illustrated and described are by way of example, and the scope of the present invention is not limited to the exact details of construction of the various parts.

Having now described the features of the invention, the construction, operation and use of preferred embodiments thereof, and the advantageous, new and useful results obtained thereby; the new and useful devices, constructions, arrangements, combinations, parts, and elements, and reasonable mechanical equivalents thereof obvious to those skilled in the art, are set forth in the appended claims.

We claim:

1. Vehicle construction including a load carrying platform, a wheeled undercarriage for said platform having a frame, means providing a fifth wheel connection between the rear end of said platform and said frame intermediate its ends, a dolly supporting the front end of said frame, means pivotally mounting the front end of said frame on said dolly, two substantially parallel longitudinal bars having substantially universal connections with said dolly and said platform, and means providing sliding movement of the dolly between said bars and said frame as the frame pivots on said dolly whereby said dolly is always maintained in a position transversely of the platform.

2. Vehicle construction including a load carrying platform, a wheeled undercarriage for said platform having a frame, means providing a fifth wheel connection between the rear end of said platform and said frame intermediate its ends, a dolly supporting the front end of said frame, means slidably and rotatably mounting the front end of said frame on said dolly, and two substantially parallel longitudinal bars providing substantially universal connections between said dolly and said platform.

3. Vehicle construction including a load carrying platform, a wheeled undercarriage for said platform having a frame, means providing a fifth wheel connection between the rear end of said platform and said frame intermediate its ends, a dolly supporting the front end of said frame, means slidably and rotatably mounting the front end of said frame on said dolly, and two substantially parallel towing bars substantially universally connecting said dolly to a forward portion of said platform.

4. Vehicle construction including a load carrying platform, a wheeled undercarriage for said platform having a frame, means providing a fifth wheel connection between the rear end of said platform and said frame intermediate its ends, a dolly supporting the front end of said frame, means pivotally mounting the front end of said frame on said dolly, two substantially parallel longitudinal towing bars having substantially universal connections at their rear ends with said dolly and at their front ends with a forward portion of said platform, and means providing lateral movement of the dolly relative to said platform as the frame pivots on the dolly whereby the towing bars maintain the dolly in a position transversely of said platform.

5. Vehicle construction including a load carrying platform, a wheeled undercarriage for said platform having a frame of A shape, said frame having rearwardly diverging side members supported at their rear ends on the rear axle of the undercarriage, a dolly pivotally supporting the convergent front ends of said side frame members, means providing a fifth wheel connection between the rear end of said platform and said frame side members intermediate their ends, two substantially parallel longitudinal bars having substantially universal connections with said dolly and said patform, and means providing sliding movement of the dolly between said bars and said frame as the frame pivots on the dolly.

6. Vehicle construction including a load carrying platform, a wheeled undercarriage for said platform having a frame of A shape, said frame having rearwardly diverging side members supported at their rear ends on the rear axle of the undercarriage, a dolly pivotally supporting the convergent front ends of said side frame members, means providing a fifth wheel connection between the rear end of said platform and said frame side members intermediate their ends, two substantially parallel longitudinal towing bars having substantially universal connections at their rear ends with said dolly and at their front ends with a forward portion of said platform, and means providing sliding movement of the dolly between said platform and frame as the frame pivots on the dolly.

7. Vehicle construction including a load carrying platform, a wheeled undercarriage for said platform having a frame of A shape, said frame having rearwardly diverging side members supported at their read ends on the rear axle of the undercarriage, a dolly pivotally supporting the convergent front ends of said side frame members, means providing a fifth wheel connection between the rear end of said platform and said frame side members intermediate their, ends means slidably and rotatably mounting the front end of said frame with respect to said dolly, and two substantially parallel longitudinal bars providing substantially universal connections between said dolly and said platform.

8. Vehicle construction including a load carrying platform, a wheeled undercarriage for said platform having a frame of A shape, said frame having rearwardly diverging side members supported at their rear ends on the rear axle of the undercarriage, a dolly pivotally supporting the convergent front ends of said side frame members, means providing a fifth wheel connection between the rear end of said platform and said frame side members intermediate their ends, means slidably and rotatably mounting the front end of said frame with respect to said dolly, and two substantially parallel towing bars substantially universally connecting said dolly to a forward portion of said platform.

9. A vehicle undercarriage having an A-shaped frame including longitudinally convergent side members, a cross member connecting the converging ends of said side members, a dolly supporting said converging ends, means providing relatively slidable and rotatable movement between said dolly and frame, another cross member connecting said side members intermediate their ends, said side and cross members all having a hollow rectangular box construction, fifth wheel means on said intermediate cross member for supporting the vehicle platform, and two substantially parallel connecting rods for providing substantially universal connections between said dolly and the vehicle platform.

10. A vehicle undercarriage having an A-shaped frame including longitudinally convergent side members, a cross member connecting the converging ends of said side members, a dolly supporting the converging ends of said side members, another cross member connecting said side members intermediate their ends, said side and cross members all having a hollow rectangular box construction, fifth wheel means on said intermediate cross member for supporting the vehicle platform, and said side members comprising U-shaped top and bottom plates having vertical flanges directed toward each other, and vertical side plates abutting the inner sides of said flanges and welded to the edges thereof, whereby the welds are located away from the high stress areas of said members.

11. In vehicle construction, a load carrying frame, an undercarriage having front and rear wheeled axles, means intermediate said axles swiveling the undercarriage with respect to the frame, and means connecting said front axle and frame for maintaining the front axle perpendicular to the longitudinal centerline of the frame as the undercarriage swivels with respect to the frame.

12. In vehicle construction, a load carrying frame, a wheeled undercarriage, the undercarriage including a generally A-shaped frame, having tubular side and cross members, said tubular members having a box-shape in cross section, said cross members including two spaced cross members intermediate the ends of the side members, a vertical sleeve secured between said two spaced cross members intermediate said side members, a rotatable plate member having king pin means journalled in said sleeve, and means pivotally mounting said load carrying frame on a horizontal axis on said rotatable plate member.

13. In vehicle construction, a load carrying frame, a wheeled undercarriage, the undercarriage including a generally A-shaped frame, having tubular side and cross members, said tubular members having a box-shape in cross section, said cross members including two spaced cross members intermediate the ends of the side members, a vertical sleeve secured between said two spaced cross members intermediate said side members, a rotatable plate member having king pin means journalled in said sleeve, means pivotally mounting said load carrying frame on a horizontal axis on said rotatable plate member, a plate on said A frame below said rotatable plate, and a washer-shaped bearing ring interposed between said plates having annular bearing surfaces overlying the side members of the A frame.

14. In vehicle construction, a load carrying frame, a wheeled undercarriage, said undercarriage including a generally A-shaped frame having forwardly converging side members, a plate secured to the forward ends of said side members having an elongated slot opening extending longitudinally of the A frame, a wheeled dolly having a plate associated with said A frame plate and having a pivot pin projecting through said slot and between said side members, bushing means around said pivot pin within said slot, a bearing disc interposed between said plates, and means for sealing lubricant between said plates and around said disc, and pivot pin and bushing means.

15. In vehicle construction, a load carrying frame, an undercarriage for the frame having relatively movable front and rear wheeled axles, swivel means between the undercarriage and frame intermediate said axles, connecting rod means between said front axle and frame maintaining the front axle perpendicular to the centerline of the frame as the undercarriage swivels with respect to the frame, and the joints between the connecting rod means and the front axle and frame each including a vertical pivot, a first sleeve journalled on said pivot, a second sleeve surrounding and spaced from said first sleeve, and a rubber sleeve interposed between and vulcanized to said first and second sleeves.

16. In vehicle construction, a load carrying frame, an undercarriage for the frame having relatively movable front and rear wheeled axles, said undercarriage including a generally A-shaped frame having tubular side and cross members, said tubular members each having a quadrilateral shape in cross section throughout, said tubular side members being free of joints at the corners thereof, each side member being tapered from an intermediate portion to each end thereof, said cross members including two spaced cross members intermediate the ends of the side members, a vertical sleeve secured between said two spaced cross members intermediate said side members, a rotatable plate member having king pin means journalled in said sleeve, a second plate mounted on said A frame beneath said rotatable plate, a washer-like bearing ring interposed between said plates having annular bearing surfaces overlying intermediate portions of said side members, means for sealing lubricant between said plates around said washer-like ring, means pivotally mounting said load carrying frame on a horizontal axis on said rotatable plate member, means journalling said rear wheeled axle adjacent the rear ends of said A frame side members, a plate secured to the underside of said side members at the forward ends thereof having an elongated slot opening extending longitudinally of the A frame, a dolly frame journalling said front wheeled axle, the dolly frame including a plate beneath said forward A frame plate having a pivot pin projecting upward through said elongated slot, an annular disc of bearing material interposed between said last mentioned plates, means for sealing lubricant between said last mentioned plates around said bearing material disc and pivot pin, a plurality of substantially parallel connecting rods extending between the load carrying frame and dolly frame, the joints between said connecting rods and frames each including a vertical pivot, a first sleeve journalled on said pivot, a second sleeve spaced from and surrounding said first sleeve, and a rubber sleeve interposed between and vulcanized to said first and second sleeves; whereby upon swiveling of the undercarriage with respect to the load carrying frame the rear wheeled axle swings laterally in one direction with respect to the load carrying frame and the front wheeled axle moves laterally of the load carrying frame in the other direction while the connecting rods maintain the front axle substantially perpendicular to the centerline of the load carrying frame.

17. Vehicle construction including a load carrying platform, a wheeled undercarriage for said platform having a frame, means providing a fifth wheel connection between the rear end of said platform and said frame intermediate its ends, a dolly supporting the front end of said frame, means rotatably mounting the front end of said frame on said dolly, and two substantially parallel longitudinal bars providing substantially universal connections between said dolly and said platform.

18. In vehicle construction, a load carrying frame, two wheeled support members for the frame, means mounting one of the support members for swinging movement laterally of the frame, means mounting the second support member for movement laterally of the frame, and laterally spaced substantially parallel members connecting the frame and second support member for maintaining the axle of said second support member substantially perpendicular to the longitudinal centerline of the frame as the second support member moves laterally of the frame.

WILBUR C. ANDERSON.
EDMUND W. RIEMENSCHNEIDER.

REFERENCES CITED

The following references are of record in the file of this patent:

UNITED STATES PATENTS

| Number | Name | Date |
|---|---|---|
| 1,513,381 | Edwards | Oct. 28, 1924 |
| 1,584,862 | Johnston | May 18, 1926 |
| 1,743,436 | Davis et al. | Jan. 14, 1930 |
| 1,846,567 | Murray | Feb. 23, 1932 |
| 2,373,398 | Hoobler | Apr. 10, 1945 |

FOREIGN PATENTS

| Number | Country | Date |
|---|---|---|
| 187,284 | Switzerland | Jan. 16, 1937 |
| 423,987 | Great Britain | Feb. 12, 1935 |
| 668,783 | Germany | Dec. 9, 1938 |
| 671,696 | Germany | Feb. 11, 1939 |